(12) United States Patent
Smiddy et al.

(10) Patent No.: US 11,021,986 B2
(45) Date of Patent: Jun. 1, 2021

(54) SEAL ASSEMBLY FOR GAS TURBINE ENGINE

(71) Applicant: United Technologies Corporation, Farmington, CT (US)

(72) Inventors: Winston Gregory Smiddy, Saco, ME (US); Paul M. Lutjen, Kennebunkport, ME (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 488 days.

(21) Appl. No.: 15/926,307

(22) Filed: Mar. 20, 2018

(65) Prior Publication Data

US 2019/0292930 A1 Sep. 26, 2019

(51) Int. Cl.
*F01D 11/08* (2006.01)
*F01D 25/12* (2006.01)
*F01D 25/24* (2006.01)

(52) U.S. Cl.
CPC .............. *F01D 11/08* (2013.01); *F01D 25/12* (2013.01); *F01D 25/246* (2013.01); *F05D 2220/323* (2013.01); *F05D 2240/11* (2013.01); *F05D 2260/20* (2013.01); *F05D 2260/30* (2013.01); *F05D 2300/20* (2013.01); *F05D 2300/6033* (2013.01)

(58) Field of Classification Search
CPC .......... F01D 11/08; F01D 11/14; F01D 11/20; F01D 11/24; F01D 25/12; F01D 25/246
See application file for complete search history.

(56) References Cited

U.S. PATENT DOCUMENTS 7,011,493 B2 * 3/2006 Marchi ................ F01D 9/04
415/116
7,434,670 B2 10/2008 Good et al.
(Continued)

FOREIGN PATENT DOCUMENTS

EP 3219934 9/2017
EP 3255252 12/2017
(Continued)

OTHER PUBLICATIONS

European Search Report for European Patent Application No. 19163554.9 completed Jul. 9, 2019.

*Primary Examiner* — Ninh H. Nguyen
*Assistant Examiner* — Cameron A Corday
(74) *Attorney, Agent, or Firm* — Carlson, Gaskey & Olds, P.C.

(57) ABSTRACT

A seal assembly for a gas turbine engine according to an example of the present disclosure includes, among other things, a seal that has a sealing portion that extends circumferentially between first and second mate faces and an engagement portion along the first mate face. A support has an interface portion that extends from a mounting portion. The interface portion abuts the engagement portion to limit relative movement, and the mounting portion defines an aperture that receives a fastener to mechanically attach the mounting portion to an engine static structure. A portion of the fastener is circumferentially aligned with the first mate face. The fastener defines a first cooling passage that delivers cooling flow at a location adjacent to the first mate face.

24 Claims, 6 Drawing Sheets

(56) References Cited

U.S. PATENT DOCUMENTS

| | | |
|---|---|---|
| 8,834,105 B2 | 9/2014 | Albers et al. |
| 2008/0206046 A1* | 8/2008 | Razzell .................... F01D 9/04 |
| | | 415/173.1 |
| 2014/0023490 A1* | 1/2014 | Hillier ................... F01D 11/005 |
| | | 415/173.6 |
| 2016/0084101 A1* | 3/2016 | McCaffrey .............. F01D 5/225 |
| | | 415/173.3 |
| 2016/0097303 A1 | 4/2016 | Baldiga et al. |
| 2016/0290144 A1 | 10/2016 | Roussille et al. |
| 2016/0333741 A1 | 11/2016 | Stapleton |
| 2016/0376921 A1* | 12/2016 | O'Leary ................... F01D 9/02 |
| | | 415/116 |

FOREIGN PATENT DOCUMENTS

| | | |
|---|---|---|
| WO | 2015038341 | 3/2015 |
| WO | 2015138027 | 9/2015 |

\* cited by examiner

SEAL ASSEMBLY FOR GAS TURBINE ENGINE

BACKGROUND

This disclosure relates to sealing for adjacent components of a gas turbine engine.

A gas turbine engine typically includes at least a compressor section, a combustor section and a turbine section. The compressor section pressurizes air into the combustion section where the air is mixed with fuel and ignited to generate an exhaust gas flow. The exhaust gas flow expands through the turbine section to drive the compressor section and, if the engine is designed for propulsion, a fan section.

The turbine section may include multiple stages of rotatable blades and static vanes. An annular shroud or blade outer air seal may be provided around the blades in close radial proximity to the tips of the blades to reduce the amount of gas flow that escapes around the blades. The shroud typically includes a plurality of arc segments that are circumferentially arranged in an array. The arc segments are exposed to relatively hot gases in the gas flow path and may be configured to receive cooling airflow to cool portions of the shrouds.

SUMMARY

A seal assembly for a gas turbine engine according to an example of the present disclosure includes a seal that has a sealing portion that extends circumferentially between first and second mate faces and an engagement portion along the first mate face. A support has an interface portion that extends from a mounting portion. The interface portion abuts the engagement portion to limit relative movement, and the mounting portion defines an aperture that receives a fastener to mechanically attach the mounting portion to an engine static structure. A portion of the fastener is circumferentially aligned with the first mate face. The fastener defines a first cooling passage that delivers cooling flow at a location adjacent to the first mate face.

In a further embodiment of any of the foregoing embodiments, the aperture threadably receives a length of the fastener.

In a further embodiment of any of the foregoing embodiments, the first cooling passage ejects cooling flow toward a surface of the first mate face.

In a further embodiment of any of the foregoing embodiments, the engagement portion defines an internal cavity that extends from an opening along the first mate face, and the interface portion has a dovetail geometry that extends through the opening to mate with ramped surfaces of the internal cavity and bound movement of the seal relative to the support.

In a further embodiment of any of the foregoing embodiments, the internal cavity extends circumferentially between the first mate face and the second mate face.

In a further embodiment of any of the foregoing embodiments, the support defines a second cooling passage that interconnects a branch segment of the first cooling passage and the internal cavity.

In a further embodiment of any of the foregoing embodiments, the first cooling passage ejects cooling flow along the first mate face.

In a further embodiment of any of the foregoing embodiments, the mounting block defines an annular groove in a wall of the aperture such that the annular groove interconnects the branch segment and the second cooling passage.

In a further embodiment of any of the foregoing embodiments, the seal is made of a first material, and the support is made of a second, different material.

In a further embodiment of any of the foregoing embodiments, the first material includes a ceramic material, and the seal has a unitary construction.

In a further embodiment of any of the foregoing embodiments, the seal is made of a first material, and the support is made of a second material that is the same as the first material.

In a further embodiment of any of the foregoing embodiments, the first material includes a ceramic material, and the seal has a unitary construction.

In a further embodiment of any of the foregoing embodiments, the seal is a blade outer air seal (BOAS).

A gas turbine engine according to an example of the present disclosure includes an engine case extending along an engine axis, an array of blades rotatable about the engine axis, and an array of blade outer air seals distributed about the array of blades to bound a core flow path. Each of the seals has a sealing portion that extends circumferentially between opposed mate faces and an engagement portion along each of the opposed mate faces, with the opposed mate faces arranged to define an intersegment gap, an array of circumferentially spaced apart mounting blocks each arranged between the engagement portion of adjacent pairs of the seals, each of the mounting blocks defining an aperture for receiving a fastener mechanically attached to the engine case to limit movement of the respective one of the seals relative to the engine case, and at least one of the fastener and the mounting blocks defines a first cooling passage that delivers cooling flow at a location adjacent to the respective intersegment gap.

In a further embodiment of any of the foregoing embodiments, at least a portion of the fastener is circumferentially aligned with the respective intersegment gap, and the fastener defines the first cooling passage.

In a further embodiment of any of the foregoing embodiments, the mounting blocks spans across each respective intersegment gap and opposed pairs of interface portions of each one of the mounting blocks abut against the adjacent pairs of seals to support the adjacent pairs of seals relative to the engine case, and the fastener defines the first cooling passage.

In a further embodiment of any of the foregoing embodiments, the first cooling passage ejects cooling flow toward surfaces of the opposed mate faces along the respective intersegment gap.

In a further embodiment of any of the foregoing embodiments, the engagement portion defines an internal cavity that extends between the opposed mate faces, and each of the opposed interface portions has a dovetail geometry that mates with ramped surfaces of the respective internal cavity to limit circumferential movement of the array of blade outer air seals relative to the engine axis.

In a further embodiment of any of the foregoing embodiments, the first cooling passage extends radially between an inlet and an outlet, the inlet is arranged to receive cooling flow from a plenum defined by an engine static structure, and the is outlet arranged to eject cooling flow into the respective intersegment gap. Each of the mountings blocks defines at least one cooling passage that is substantially aligned with at least one branch segment of the respective first cooling passage to deliver cooling flow from the respective first cooling passage to the internal cavity of at least one of the respective adjacent pairs of the seals.

In a further embodiment of any of the foregoing embodiments, at least one cooling passage includes a plurality of cooling passages. At least one branch includes a plurality of branch segments. The plurality of cooling passages are substantially aligned with the plurality of branch segments to deliver cooling flow from the respective first cooling passage to the internal cavity of each of the respective adjacent pairs of the seals.

A method of sealing of a gas turbine engine according to an example of the present disclosure includes positioning a mounting block between mate faces of adjacent blade outer air seals, and securing with a fastener the mounting block to an engine case. The fastener has a first cooling passage, and communicates cooling flow from the first cooling passage to a location adjacent to an intersegment gap defined by the mate faces.

In a further embodiment of any of the foregoing embodiments, the method includes ejecting cooling flow from an outlet of the first cooling passage into the intersegment gap.

In a further embodiment of any of the foregoing embodiments, each of the adjacent blade outer air seals defines an internal cavity that extends away from an opening defined by a respective one of the mate faces. The mounting block includes opposed interface portions each having a dovetail geometry. The step of positioning the mounting block includes moving each of the interface portions through the opening of a respective one the adjacent blade outer air seals and into abutment with ramped surfaces of the respective internal cavity.

In a further embodiment of any of the foregoing embodiments, the method includes communicating cooling flow from a plenum defined by an engine static structure into an inlet of the first cooling passage, then through at least one branch of the first cooling passage and into at least one cooling passage defined by the mounting block, and then from the at least one cooling passage into the internal cavity of at least one of the adjacent blade outer air seals.

In a further embodiment of any of the foregoing embodiments, the at least one cooling passage includes a plurality of cooling passages. The at least one branch has a plurality of branch segments. The plurality of cooling passages are substantially aligned with the plurality of branch segments to deliver cooling flow from the respective first cooling passage to the internal cavity of each of the respective adjacent blade outer air seals.

The various features and advantages of this invention will become apparent to those skilled in the art from the following detailed description of an embodiment. The drawings that accompany the detailed description can be briefly described as follows.

DETAILED DESCRIPTION

Figure 1:
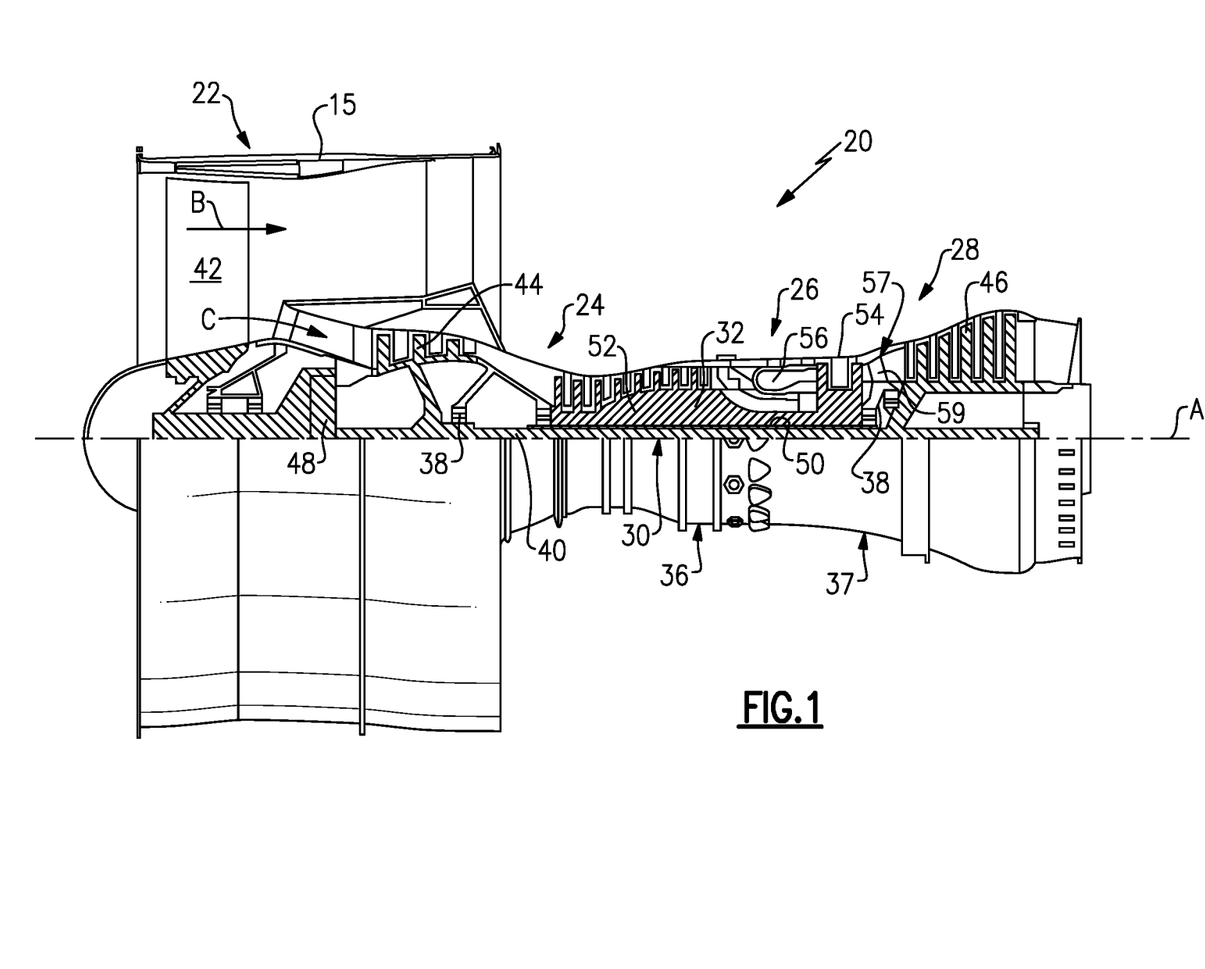
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition— typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram }° \text{R})/(518.7° \text{R})]^{-0.5}$. The "Low corrected fan tip speed" as disclosed herein according to one non-limiting embodiment is less than about 1150 ft/second.

Figure 2:
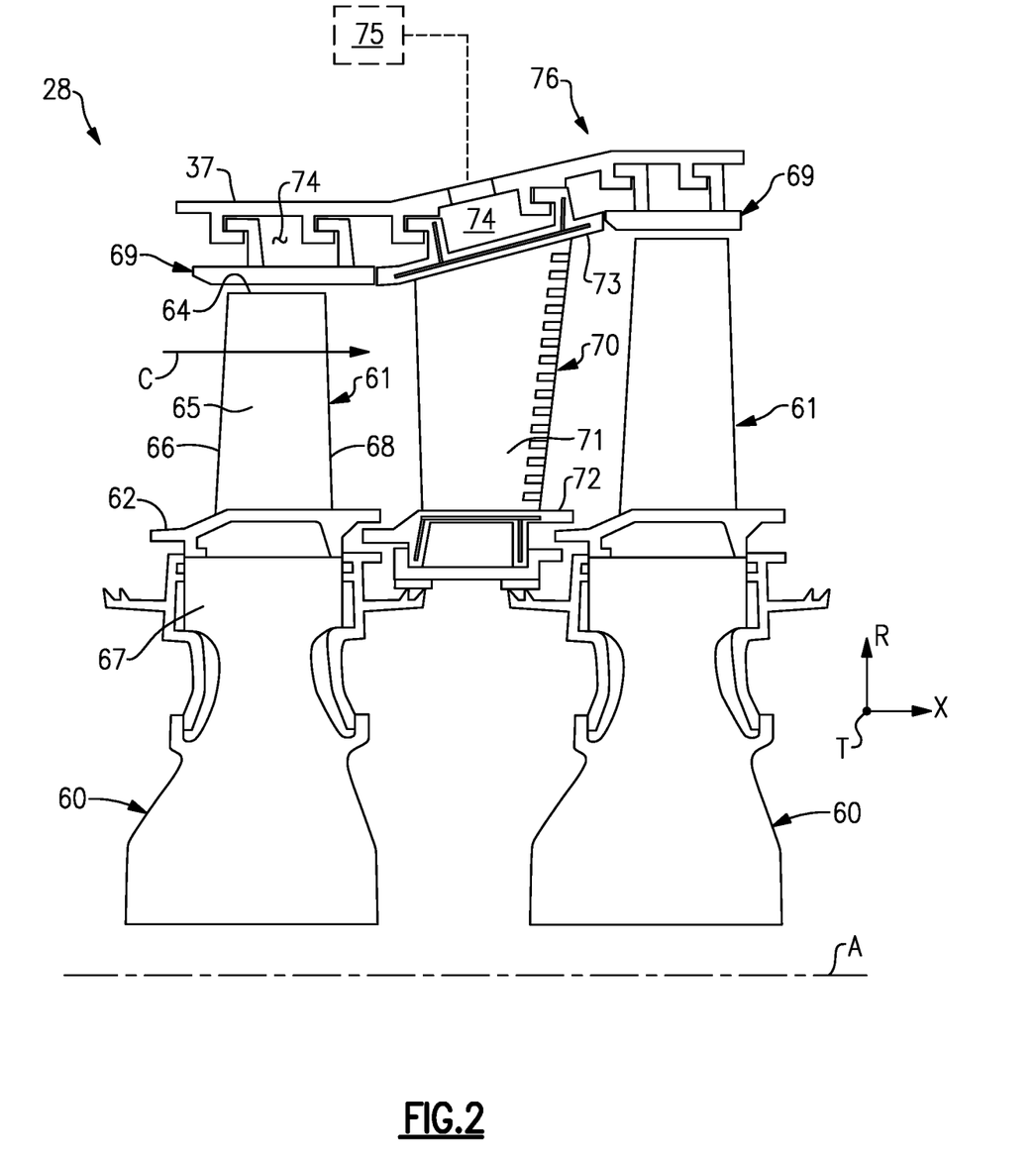
FIG. 2 schematically shows an airfoil arrangement for a turbine section.

FIG. 2 shows selected portions of the turbine section 28 including a rotor 60 carrying one or more blades or airfoils 61 that are rotatable about the engine axis A. In this disclosure, like reference numerals designate like elements where appropriate and reference numerals with the addition of one-hundred or multiples thereof designate modified elements that are understood to incorporate the same features and benefits of the corresponding original elements. Each airfoil 61 includes a platform 62 and an airfoil section 65 extending in a radial direction R from the platform 62 to a tip 64. The airfoil section 65 generally extends in a chordwise or axial direction X between a leading edge 66 and a trailing edge 68. A root section 67 of the airfoil 61 is mounted to, or integrally formed with, the rotor 60. A blade outer air seal (BOAS) 69 is spaced radially outward from the tip 64 of the airfoil section 65. The BOAS 69 can include a plurality of seal arc segments (one shown in FIG. 3 at 169) that are circumferentially arranged in an annulus around the engine axis A. An array of the BOAS 69 are distributed about an array of the airfoils 61 to bound the core flow path C.

A vane 70 is positioned along the engine axis A and adjacent to the airfoil 61. The vane 70 includes an airfoil section 71 extending between an inner platform 72 and an outer platform 73 to define a portion of the core flow path C. The turbine section 28 includes an array of airfoils 61, vanes 70, and BOAS 69 arranged circumferentially about the engine axis A.

One or more cooling sources 75 (one shown) are configured to provide cooling air to one or more cooling cavities or plenums 74 defined by an engine static structure such as the engine case 37 or another portion of the engine static structure 36 (FIG. 1). In the illustrated example of FIG. 2, the plenums 74 are defined between an engine case 37 and the outer platform 73 and/or BOAS 69. The engine case 37 provides a portion of the engine static structure 36 (FIG. 1) and extends along the engine axis A. The plenums 74 are configured to receive pressurized cooling flow from the cooling source(s) 75 to cool portions of the airfoil 61, BOAS 69 and/or vane 70. Cooling sources 75 can include bleed air from an upstream stage of the compressor section 24 (FIG. 1), bypass air, or a secondary cooling system aboard the aircraft, for example. Each of the plenums 74 can extend in a circumferential or thickness direction T between adjacent airfoils 61, BOAS 69 and/or vanes 70. The tips 64 of each of the airfoil sections 65 and adjacent BOAS 69 are in close radial proximity to reduce the amount of gas flow that escapes around the tips 64 through a corresponding clearance gap.

Figure 3:
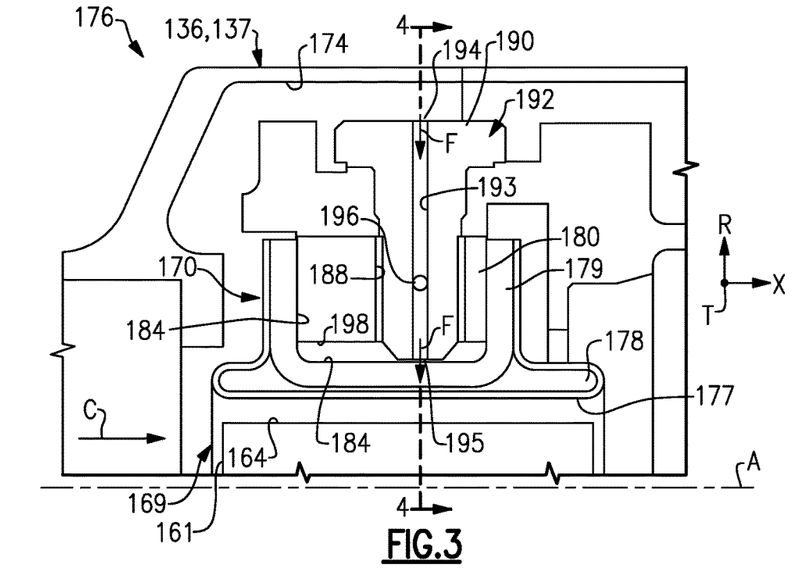
FIG. 3 illustrates a sectional view of a seal assembly.
Figure 4:
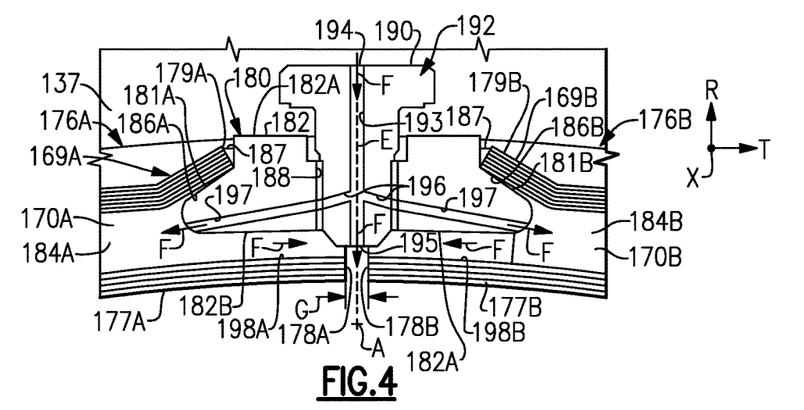
FIG. 4 illustrates a section view of the seal assembly along line 4-4 of FIG. 3, with the seal assembly arranged adjacent to another seal assembly.
Figure 5:
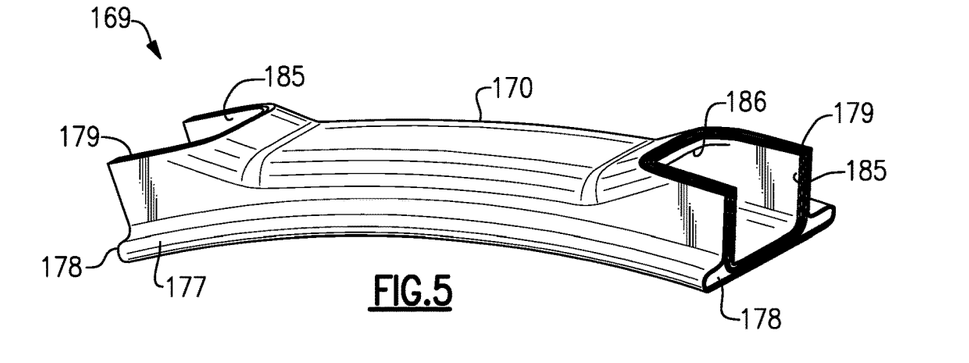
FIG. 5 illustrates a perspective view of a seal.
Figure 6:
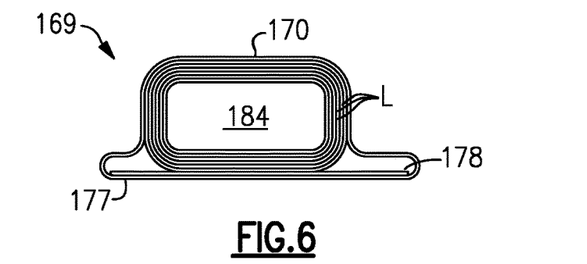
FIG. 6 illustrates a sectional view of the seal of FIG. 5.
Figure 7:
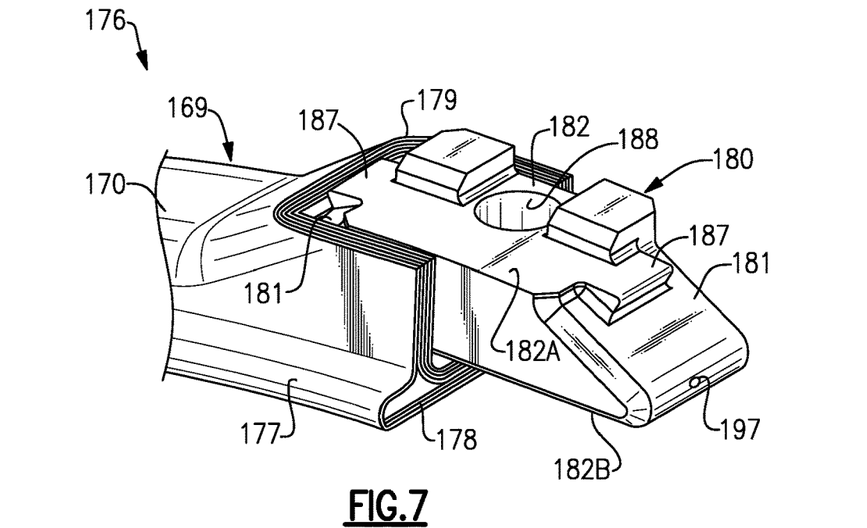
FIG. 7 illustrates a perspective view of a support inserted into the seal of FIG. 5.

FIGS. 3-7 illustrate an exemplary seal assembly 176 for supporting components of a gas turbine engine, such as a seal 169 that can be incorporated into the engine 20 of FIG. 1. In the illustrated example of FIGS. 3-7, the seal 169 is a blade outer air seal (BOAS). FIG. 3 is sectional view of the seal assembly 176 in an installed position. FIG. 4 is a sectional view of an adjacent pair of seal assemblies 176 (indicated as 176A, 176B). FIGS. 5 and 6 illustrate perspective and sectional views of the seal 169. FIG. 7 illustrates a support or mounting block 180 of the seal assembly 176 inserted into the seal 169. Although the components discussed herein primarily refer to a BOAS in the turbine section 28, the teachings herein can also be utilized for other components of the engine 20, such as one of the platforms 62, 72, 73, an upstream stage of the compressor section 24, or combustor panels or liners defining portions of a combustion chamber located in the combustor section 26.

Referring to FIGS. 3 and 4, each seal assembly 176 includes a seal 169 and a support or mounting block 180. Each seal 169 is arranged in close proximity to an airfoil tip 164 during operation of the engine. An array of the seals 169 are distributed about an array of blades or airfoils 161 to bound a core flow path C (one pair of seals 169A, 169B shown in FIG. 4 for illustrative purposes).

The seal 169 includes a main body 170 that extends circumferentially between opposed (or first and second) mate faces 178. The main body 170 can have a generally elongated and arcuate profile, as illustrated by FIGS. 5 and 6. The seal 169 includes a sealing portion 177 that extends circumferentially between the mate faces 178, with exposed surfaces of the sealing portion 177 bounding the core flow path C. Each seal 169 also includes an engagement portion 179 along each of the mate faces 178. Each engagement portion 179 can extend radially outward from the sealing portion 177 when in an installed position.

The seal 169 includes an internal cavity 184 defined by the main body 170 that extends inwardly from an opening 185 along each of the respective mate faces 178. The engagement portion 179 defines a portion of the internal cavity 184, as illustrated by FIGS. 4 and 5. The internal cavity 184 can be substantially closed between the engagement portions 179 and extends circumferentially between the mate faces 178.

In some examples, the seal 169 is made of a first material, and the mounting block 180 is made of a second, different material. For example, the first material can include a ceramic or ceramic matrix composite (CMC) material. The seal 169 can be formed from one or more layers L of a CMC layup (FIG. 6). In other examples, the seal 169 is made of another material, such as a high temperature metal, alloy, or composite material. The mounting block 180 can be made of a high temperature composite, metal, or alloy, such as a nickel-based superalloy, for example. In examples, the seal 169 is made of a first material, and the mounting block 180 is made of a second material that is the same as the first material, including any of the materials disclosed herein. The seal 169 is formed to have a unitary construction. In alternative examples, the sealing portion 177 and each engagement portion 179 are separate and distinct components that are mechanically attached to one another with one or more fasteners.

The mounting block 180 secure one or more of the seals 169 to a housing such as engine case 137, or to another portion of the engine static structure 36 (FIG. 1). The mounting block 180 includes at least one interface portion 181 extending outwardly from a main body or mounting portion 182. In the illustrated example of FIGS. 4 and 7, the mounting block 180 includes a pair of opposed interface portions 181 that extend outwardly from the mounting portion 182. Each interface portion 181 is dimensioned to abut the engagement portion 179 of the respective seal 169 to limit relative movement in the radial and/or circumferential directions, for example.

A cross-section of the mounting block 180 can have a generally trapezoidal geometry, as illustrated by FIGS. 4 and 7. Surfaces of each interface portion 181 slope outwardly between a top 182A and bottom 182B of the mounting portion 182. In the illustrated example of FIGS. 4 and 7, the interface portions 181 have a dovetail geometry. Each interface portion 181 can be inserted into or otherwise extend through a respective opening 185 to mate with ramped surfaces 186 of the internal cavity 184 (see FIGS. 4 and 5) to bound movement of the seal 169 relative to the mounting block 180. The dovetail geometry circumferentially overlaps with the engagement portions 179A, 179B when in the installed position to secure adjacent pairs of the seal assemblies 176 to the engine case 137. Ends of the interface portions 181 can be contoured guide the interface portions 181 into the respective internal cavities 184 during installation. The dovetail geometry and contouring can reduce mechanical stress on the seal 169, including seals made of a composite material which can be strong but relative brittle.

As illustrated by FIGS. 4 and 7, each interface portion 181 can include an outwardly extending retention feature 187. The retention feature 187 is dimensioned to abut against surfaces of the engagement portion 179 to seat the seal 169 during assembly and limit circumferential and/or radial movement.

The mounting block 180 can be secured to the engine case 137 using one or more fasteners 190 (one shown for illustrative purposes). Each mounting portion 182 defines an aperture 188 that receives a respective fastener 190 to mechanically attach the mounting portion 182 to the engine case 137 and limit relative movement of one or more seals 169. In the illustrated example, the fastener 190 is a bolt, and the aperture 188 threadably receives a length of the bolt. In alternative examples, the fastener 190 is a clip or another structure to secure the seal 169 to the engine static structure 136.

In the illustrated example of FIG. 4, a pair of adjacent seal assemblies 176A, 176B arranged in close proximity such that the respective mate faces 178A, 178B define an intersegment gap G that extends a distance in the circumferential direction T. The mounting block 180 spans across the intersegment gap G. A portion of the fastener 190 can be circumferentially aligned with one or more of the adjacent mate faces 178A, 178B and/or the intersegment gap G. The interface portions 181 abut against the adjacent seals 169 to support the adjacent seals 169 relative to the engine case 137 and limit circumferential movement of the adjacent seals 169 relative to the engine axis A. The mounting block 180 is arranged between the engagement portions 179A, 179B to circumferentially space apart the seals 169A, 169B. Each mounting block 180 secures the engagement portions 179A, 179B to the engine case 137 when in the installed position.

As illustrated by FIGS. 3 and 4, the seal assembly 176 defines a cooling arrangement 192 to deliver cooling flow to portions of the seal 169 and/or other portions of the assembly 176 and engine 20. The cooling arrangement 192 includes a first cooling passage 193 defined by the fastener 190 that delivers cooling flow F (indicated by arrows) at a location adjacent to the mate faces 178A, 178B and/or respective intersegment gap G. The first cooling passage 193 extends radially between an inlet 194 and an outlet 195. The inlet 194 is arranged to received cooling flow F supplied by the plenum 174 or another coolant source. A diameter of the first cooling passage 193 including the inlet 194 can be dimensioned to meter flow and reduce inefficiencies due to excess cooling flow F that may otherwise be communicated to provide localized cooling.

The outlet 195 can be arranged such that the first cooling passage 193 ejects cooling flow F towards and along surface(s) of at least one of the mate faces 178A, 178B and directly into the intersegment gap G. Communication of the cooling flow F can cool portions of the mate faces 178A, 178B, thereby improving durability of the seals 169A, 169B. Communicating the cooling flow F also causes a sealing relationship to be formed, including ejecting pressurized cooling flow F directly into the intersegment gap G, to reduce a likelihood of ingestion of hot combustion gases from the core flow path C and into the intersegment gap G. In alternative examples, the mounting block 180 is positioned at another location than along the intersegment gap G to secure the seal 169 to the engine case 137, such as a midspan of the seal 169.

Figure 8:
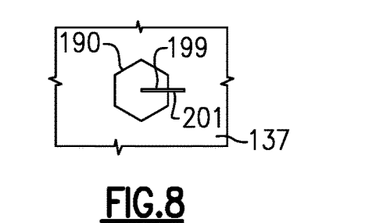
FIG. 8 illustrates a top view of a fastener.

The fastener 190 can define a plurality of branch segments 196 that can extend in a circumferential direction T away from a longitudinal axis E of the fastener 190 (FIG. 4). The mounting block 180 defines a plurality of second cooling passages 197 that extend in the circumferential direction away from the aperture 188. The second cooling passages 197 can be substantially aligned with the branch segments 196 to interconnect the branch segments 196 and the internal cavities 184A, 184B and to deliver cooling flow F from the first cooling passage 193 to the internal cavities 184A, 184B. As illustrated by FIG. 8, the fastener 190 can include a locating feature 199 which can be aligned with a locating feature 201 of engine case 137, such as a pair of visual indicators or marks, to assist in circumferentially aligning outlets of the branch segments 196 and inlets of the second cooling passages 197. Although only two branch segments 196 and two second cooling passages 197 are shown, fewer or more branch segments 196 and second cooling passages 197 can be utilized to deliver cooling flow F to portions of the seal assembly 176. The arrangement of the branch segments 196 and second cooling passages 197 can be utilized to deliver localized cooling to the mounting block 180 and portions of the seals 169A, 169B adjacent to the mate faces 178A, 178B and intersegment gap G.

Each of the mounting blocks 180 can be dimensioned such that radially inner surfaces of the mounting block 180 are spaced apart from walls of the internal cavities 184A, 184B to define circumferentially extending passages 198A, 198B that communicate cooling flow F from the internal cavities 184A, 184B into the intersegment gap G, as illustrated by FIGS. 3 and 4. Each passage 198 can deliver localized cooling to portions of the seal 169 adjacent to the respective mate face 178.

A method of sealing is as follows. With reference to FIG. 4, the mounting block 180 is positioned between mate faces 178A, 178B of adjacent seals 169A, 169B. Each of the interface portions 181A, 181B is inserted or otherwise moved in a circumferential direction T through a respective one of the openings 185A, 185B and into abutment with the ramp surfaces 186A, 186B of the engagement portions 179A, 179B to bound movement of the seals 169A, 169B. Thereafter, the fastener 190 is mechanically attached or otherwise secured to the mounting block 180.

During operation of the engine, cooling flow F can be communicated from the first cooling passage 193 to a location adjacent to the mate faces 178A, 178B and intersegment gap G. Cooling flow F can be ejected from the outlet 195 of the first cooling passage 193 directly into the intersegment gap G. Cooling flow F can be communicated from the plenum 174 into the inlet 194, then through one or more branch segments 196 of the first cooling passage 193 into one or more second cooling passages 197, and then from the second cooling passages 197 into the internal cavities 184A, 184B to provide localized cooling to portions of the seals 169A, 169B adjacent to the mate faces 178A, 178B.

Figure 9:
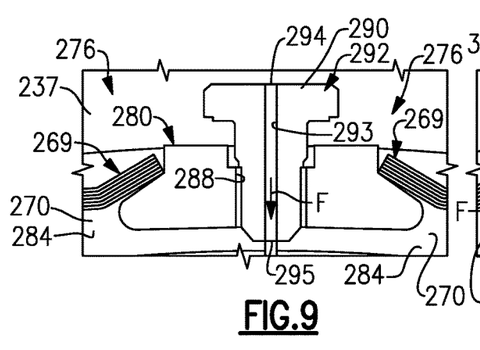
FIG. 9 illustrates a sectional view of a seal assembly according to another example.

FIG. 9 illustrates a seal assembly 276 including a cooling arrangement 292 according to another example. A fastener 290 defines a first cooling passage 293 that extends between an inlet 294 and an outlet 295. In the illustrated example, mounting block 280 is free of any cooling passages.

Figure 10:
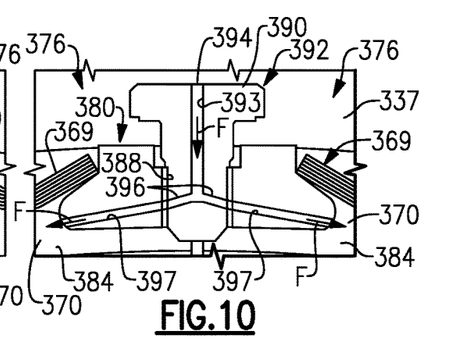
FIG. 10 illustrates a sectional view of a seal assembly according to yet another example.

FIG. 10 illustrates a seal assembly 376 including a cooling arrangement 392 according to yet another example. Fastener 390 defines a first cooling passage 393 that extends from an inlet 394 to a plurality of branch segments 396. The first cooling passage 393 terminates prior to a radially innermost portion of the fastener 390. The branch segments 396 are substantially aligned with a plurality of second cooling passages 397 when in an installed position to deliver cooling flow F to one or more internal cavities 384.

Figure 11:
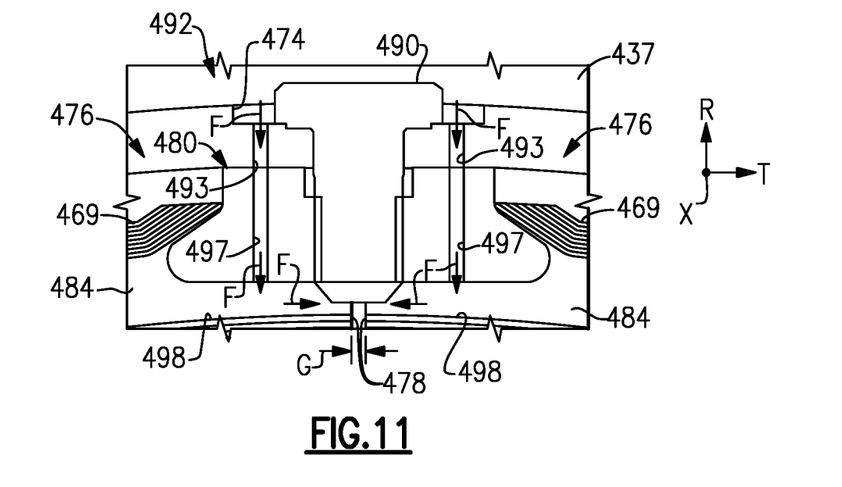
FIG. 11 illustrates a sectional view of a seal assembly according to another example.

FIG. 11 illustrates a seal assembly 476 including a cooling arrangement 492 according to yet another example. Mounting block 480 defines a plurality of secondary cooling passages 497 that receive cooling flow F from a corresponding plurality of first cooling passages 493 defined by engine case 437. Fastener 490 is free of any cooling passages such that the cooling flow F bypasses the fastener 490 and is directly communicated from plenum 474 to the mounting block 480. The cooling passages 493, 497 can extend radially in a radially direction R such that cooling flow F is ejected from outlets of the cooling passages 497 to impinge on surfaces of the internal cavities 484 and to provide localized cooling to portions of seals 469 adjacent to mate faces 478. The mounting block 480 is dimensioned to define circumferentially extending passages 498 to communicate the cooling flow F to intersegment gap G.

Figure 12:
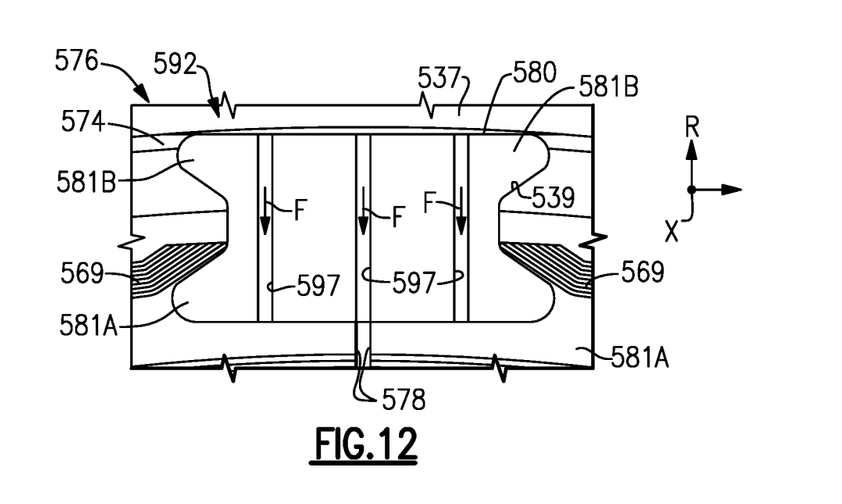
FIG. 12 illustrates a sectional view of another exemplary seal assembly.

FIG. 12 illustrates a seal assembly 576 including a cooling arrangement 592 according to another example. Mounting block 580 includes a first pair of interface portions 581A and a second pair of interface portions 581B. Each pair of the interface portions 581A, 581B defines a dovetail geometry. Interface portions 581A abut against surfaces of one or more seals 569. Interface portions 581B are secured to engine case 537. The engine case 537 defines an axially extending slot 539 that has a complementary geometry with surfaces of the interface portions 581B. To secure the mounting block 580 to the engine case 537, the mounting block 580 is moved in an axial direction X into and at least partially through the slot 539. The seals 569 can be secured to the mounting block 580 prior to or after the mounting block 580 is secured to the engine case 537.

The mounting block 580 defines a plurality of cooling passages 597 that receive cooling flow F from a plenum 574 defined by engine case 537. The cooling passages 597 can be oriented to eject cooling flow F from outlets of the passages 597 to impinge on surfaces of internal cavities 584 adjacent to mate faces 578.

Figure 13:
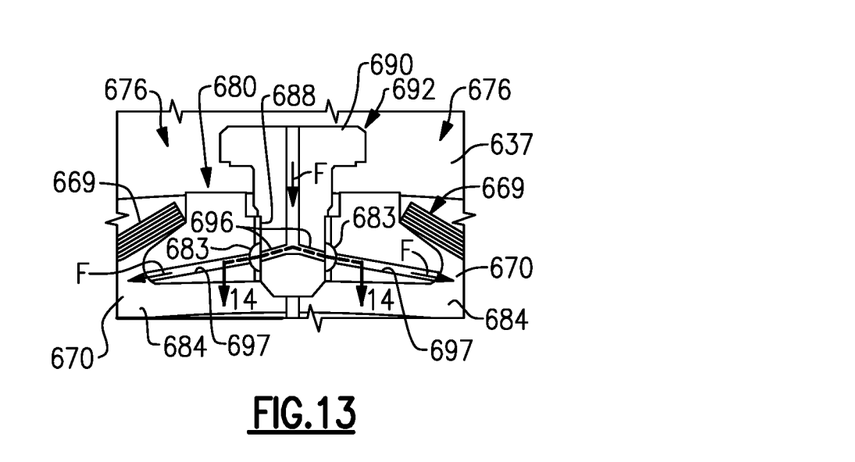
FIG. 13 illustrates a sectional view of yet another exemplary seal assembly.
Figure 14:
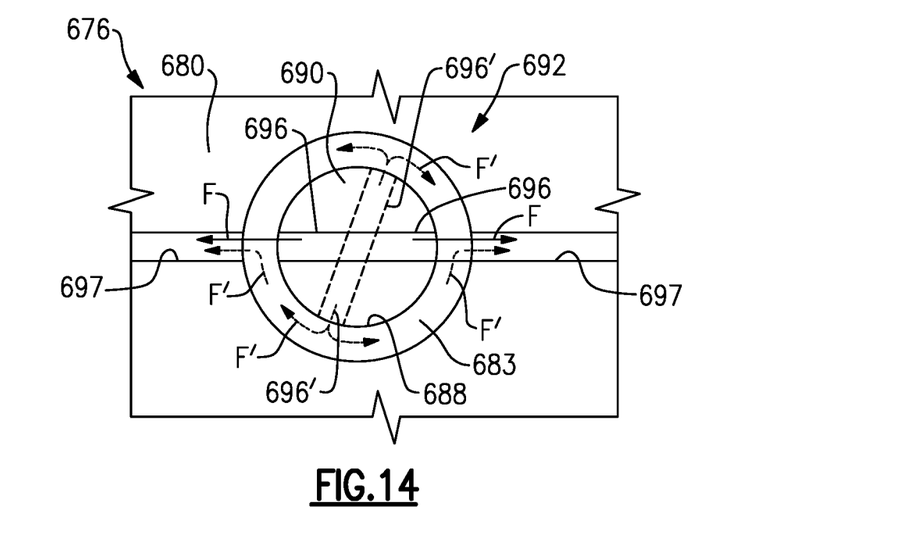
FIG. 14 illustrates a sectional view of the exemplary seal assembly along line 14-14 of FIG. 13.

FIGS. 13 and 14 illustrate a seal assembly 676 including a cooling arrangement 692 according to yet another example. Mounting block 680 defines a trench or annular groove 683 that extends inwardly from a wall of aperture 688. As illustrated by FIG. 14, the groove 683 can extend circumferentially about the wall of aperture 688 to form a loop. The groove 683 interconnects branch segments 696 defined by fastener 690 and second cooling passages 697 defined in the mounting block 680. Misalignment may occur when threadably installing the fastener 690 in the aperture 688 or due to manufacturing tolerances, for example. The groove 683 can simplify assembly by accommodating circumferentially misalignment between the branch segments 696 and the second cooling passages 697 while still maintaining fluid flow, as illustrated by branch segments 696' in FIG. 14 (shown in dashed lines).

It should be understood that relative positional terms such as "forward," "aft," "upper," "lower," "above," "below," and the like are with reference to the normal operational attitude of the vehicle and should not be considered otherwise limiting.

Although the different examples have the specific components shown in the illustrations, embodiments of this disclosure are not limited to those particular combinations. It is possible to use some of the components or features from one of the examples in combination with features or components from another one of the examples.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A seal assembly for a gas turbine engine, comprising:
a seal including a sealing portion that extends in a circumferential direction between first and second mate faces and includes an engagement portion along the first mate face, the sealing portion having a seal face extending in an axial direction between a leading edge and a trailing edge, the seal face dimensioned to bound a gas path, and the engagement portion extending in a radial direction from the sealing portion;
a mounting block including an interface portion extending from a mounting portion, the interface portion abutting the engagement portion to limit relative movement, and the mounting portion defining an aperture that receives a fastener to mechanically attach the mounting portion to an engine static structure;
wherein at least a portion of the fastener is aligned in the circumferential direction with the first mate face, and the fastener is spaced apart in the circumferential direction from the second mate face;
wherein the fastener defines a first cooling passage that delivers cooling flow at a location adjacent to the first mate face;
wherein the engagement portion defines an internal cavity, the internal cavity extends in the circumferential direction from a first opening along the first mate face to a second opening along the second mate face, and the interface portion extends in the circumferential direction through the first opening and into the internal cavity to bound movement of the seal relative to the mounting block; and
wherein the first cooling passage extends in the radial direction between an inlet and an outlet, and the outlet is offset from the seal with respect to the circumferential direction.

2. The seal assembly as recited in claim 1, wherein the aperture threadably receives a length of the fastener.

3. The seal assembly as recited in claim 1, wherein the first cooling passage ejects cooling flow toward a surface of the first mate face.

4. The seal assembly as recited in claim 1, wherein the interface portion has a dovetail geometry that extends through the first opening to mate with ramped surfaces of the internal cavity.

5. The seal assembly as recited in claim 4, wherein the mounting block defines a second cooling passage that interconnects a branch segment of the first cooling passage and the internal cavity.

6. The seal assembly as recited in claim 5, wherein the first cooling passage ejects cooling flow along the first mate face.

7. The seal assembly as recited in claim 4, wherein the seal is made of a first material, and the mounting block is made of a second, different material.

8. The seal assembly as recited in claim 7, wherein the first material includes a ceramic material, and the seal has a unitary construction.

9. The seal assembly as recited in claim 8, wherein the seal is a blade outer air seal (BOAS).

10. The seal assembly as recited in claim 4, wherein the mounting block defines a second cooling passage that interconnects a first branch segment of the first cooling passage and the internal cavity, and the mounting block defines a third cooling passage that interconnects a second branch segment of the first cooling passage and an internal cavity of an adjacent seal spaced apart in the circumferential direction from the seal to establish an intersegment gap.

11. The seal assembly as recited in claim 10, wherein the outlet is positioned along the intersegment gap.

12. The seal assembly as recited in claim 11, wherein the aperture threadably receives a length of the fastener.

13. The seal assembly as recited in claim 11, wherein the seal is a blade outer air seal (BOAS).

14. The seal assembly as recited in claim 1, wherein the seal is made of a first material, and the mounting block is made of a second, different material.

15. The seal assembly as recited in claim 14, wherein the first material includes a ceramic material, and the seal has a unitary construction.

16. The seal assembly as recited in claim 1, wherein the seal is made of a first material, and the mounting block is made of a second material that is the same as the first material.

17. The seal assembly as recited in claim 16, wherein the first material includes a ceramic material, and the seal has a unitary construction.

18. The seal assembly as recited in claim 1, wherein the seal is a blade outer air seal (BOAS).

19. A gas turbine engine, comprising:
an engine case extending along an engine axis;
an array of blades rotatable about the engine axis;
an array of blade outer air seals distributed about the array of blades to bound a core flow path, each of the seals including a sealing portion that extends circumferentially between opposed mate faces and an engagement portion along each of the opposed mate faces, with the opposed mate faces arranged to define an intersegment gap;
an array of circumferentially spaced apart mounting blocks each arranged between the engagement portion of adjacent pairs of the seals, each of the mounting blocks defining an aperture for receiving a fastener mechanically attached to the engine case to limit movement of the respective one of the seals relative to the engine case;
wherein at least one of the fastener and the mounting blocks defines a first cooling passage that delivers cooling flow at a location adjacent to the respective intersegment gap;
wherein the mounting blocks span across each respective intersegment gap and opposed pairs of interface portions of each one of the mounting blocks abut against the adjacent pairs of seals to support the adjacent pairs of seals relative to the engine case, and the fastener defines the first cooling passage;
wherein the first cooling passage extends radially between an inlet and an outlet, the inlet arranged to receive cooling flow from a plenum defined by an engine static structure, and the outlet arranged to eject cooling flow into the respective intersegment gap; and
wherein each of the mountings blocks defines at least one cooling passage that is substantially aligned with at least one branch segment of the respective first cooling passage to deliver cooling flow from the respective first cooling passage to an internal cavity of at least one of the respective adjacent pairs of the seals.

20. The gas turbine engine as recited in claim 19, wherein at least a portion of the fastener is circumferentially aligned with the respective intersegment gap.

21. The gas turbine engine as recited in claim 19, wherein the first cooling passage ejects cooling flow toward surfaces of the opposed mate faces along the respective intersegment gap.

22. The gas turbine engine as recited in claim 19, wherein:
the at least one cooling passage includes a plurality of cooling passages;
the at least one branch includes a plurality of branch segments; and
the plurality of cooling passages are substantially aligned with the plurality of branch segments to deliver cooling flow from the respective first cooling passage to the internal cavity of each of the respective adjacent pairs of the seals.

23. The gas turbine engine as recited in claim 19, wherein the engagement portion defines the internal cavity, the internal cavity extends between the opposed mate faces, and each of the opposed interface portions has a dovetail geometry that mates with ramped surfaces of the respective internal cavity to limit circumferential movement of the array of blade outer air seals relative to the engine axis.

24. A gas turbine engine comprising:
an engine case extending along an engine axis;
an array of blades rotatable about the engine axis;
an array of blade outer air seals distributed about the array of blades to bound a core flow path, each of the seals including a sealing portion that extends circumferentially between opposed mate faces and an engagement portion along each of the opposed mate faces, with the opposed mate faces arranged to define an intersegment gap; and
an array of circumferentially spaced apart mounting blocks each arranged between the engagement portion of adjacent pairs of the seals, each of the mounting blocks defining an aperture for receiving a fastener mechanically attached to the engine case to limit movement of the respective one of the seals relative to the engine case;
wherein the fastener defines a first cooling passage that delivers cooling flow at a location adjacent to the respective intersegment gap;
wherein the mounting blocks span across each respective intersegment gap and opposed pairs of interface portions of each one of the mounting blocks abut against the adjacent pairs of seals to support the adjacent pairs of seals relative to the engine case; and
wherein the engagement portion defines an internal cavity that extends between the opposed mate faces, and each of the opposed interface portions has a dovetail geometry that mates with ramped surfaces of the respective internal cavity to limit circumferential movement of the array of blade outer air seals relative to the engine axis.

* * * * *